(12) United States Patent
Baumgart et al.

(10) Patent No.: US 7,719,786 B1
(45) Date of Patent: May 18, 2010

(54) ACTIVE FLY HEIGHT CONTROL USING RADIO FREQUENCY FEEDBACK

(75) Inventors: Peter Baumgart, Santa Clara County, CA (US); Luiz M. Franca-Neto, Santa Clara County, CA (US); Bernhard E. Knigge, Santa Clara County, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 12/343,039

(22) Filed: Dec. 23, 2008

(51) Int. Cl.
*G11B 5/60* (2006.01)
(52) U.S. Cl. ...................................... 360/75
(58) Field of Classification Search ........................ None
See application file for complete search history.

(56) References Cited

U.S. PATENT DOCUMENTS

| | | | | |
|---|---|---|---|---|
| 4,648,087 A * | 3/1987 | Scranton et al. | .......... | 360/234.7 |
| 4,931,887 A * | 6/1990 | Hegde et al. | ................. | 360/75 |
| 6,728,050 B2 * | 4/2004 | Wilson | ........................ | 360/75 |
| 7,292,401 B2 * | 11/2007 | Shen et al. | ..................... | 360/69 |
| 7,330,324 B2 * | 2/2008 | Morinaga et al. | ............. | 360/75 |
| 7,349,170 B1 * | 3/2008 | Rudman et al. | ................ | 360/75 |
| 7,405,896 B2 * | 7/2008 | Hirano et al. | ................. | 360/75 |
| 7,450,333 B2 * | 11/2008 | Hirano et al. | ................. | 360/75 |
| 7,450,335 B2 * | 11/2008 | Hirano et al. | ............ | 360/77.03 |
| 2007/0127147 A1 * | 6/2007 | Yokohata et al. | ............. | 360/75 |
| 2007/0127148 A1 * | 6/2007 | Yokohata et al. | ............. | 360/75 |

\* cited by examiner

*Primary Examiner*—William J Klimowicz
*Assistant Examiner*—James L Habermehl

(57) ABSTRACT

In a method of actively controlling slider fly height, a modulated radio frequency (RF) carrier signal is received from a slider. The modulated RF carrier signal comprises an amplitude modulated component which is modulated onto the modulated RF carrier signal by vibration of the slider. The amplitude associated with the amplitude modulated component is measured. Thermal fly height control (TFC) voltage generation is controlled by feeding back on the amplitude. A TFC voltage to apply to the slider is generated such that a selected amplitude of the amplitude modulated component is achieved and maintained. The selected amplitude is associated with a particular preselected fly height of the slider above a surface of a disk. The TFC voltage is provided to the slider.

23 Claims, 12 Drawing Sheets

900

US 7,719,786 B1

ACTIVE FLY HEIGHT CONTROL USING RADIO FREQUENCY FEEDBACK

BACKGROUND

Hard disk drives are used in almost all computer system operations. In fact, most computing systems are not operational without some type of hard disk drive to store the most basic computing information such as the boot operation, the operating system, the applications, and the like.

Over the years, the disk and the head have undergone great reductions in their size. Much of the refinement has been driven by consumer demand for smaller and more portable hard drives such as those used in personal digital assistants (PDAs), Moving Picture Experts Group audio layer 3 (MP3) players, and the like. For example, the original hard disk drive had a disk diameter of 24 inches. Modern hard disk drives are much smaller and include disk diameters of less than 2.5 inches. Advances in magnetic recording are also primary reasons for the reduction in size.

Modern drives often have very narrow tolerances for components and operation of components. Disk drive sliders are designed to fly in very close proximity to the disk surface. For instance, in some systems the slider may be designed to fly only three to five nanometers above the disk surface. In a system with such close tolerances and low slider fly heights, components can be subject to van der Waals, Meniscus, electrostatic, spindle motor charge up, and contact potential forces. These forces are due to a variety of causes, such as: the molecular attraction of components in very close proximity; adhesive friction caused by contact between the slider and the lubricant on the disk; the build up of electrical potential between the disk and the slider caused by the rotating disk surface (tribo-charging); the build up of electrical potential in motor bearings (tribo-charging); potential difference (e.g., contact potential difference/difference in work functions) that exists between two different metals (different Fermi levels of slider and disk material); and impacts between the slider and disk surface.

BRIEF DESCRIPTION OF THE DRAWINGS

The accompanying drawings, which are incorporated in and form a part of this specification, illustrate various embodiments of the present invention and, together with the description of embodiments, serve to explain principles discussed below.

Figure 1:
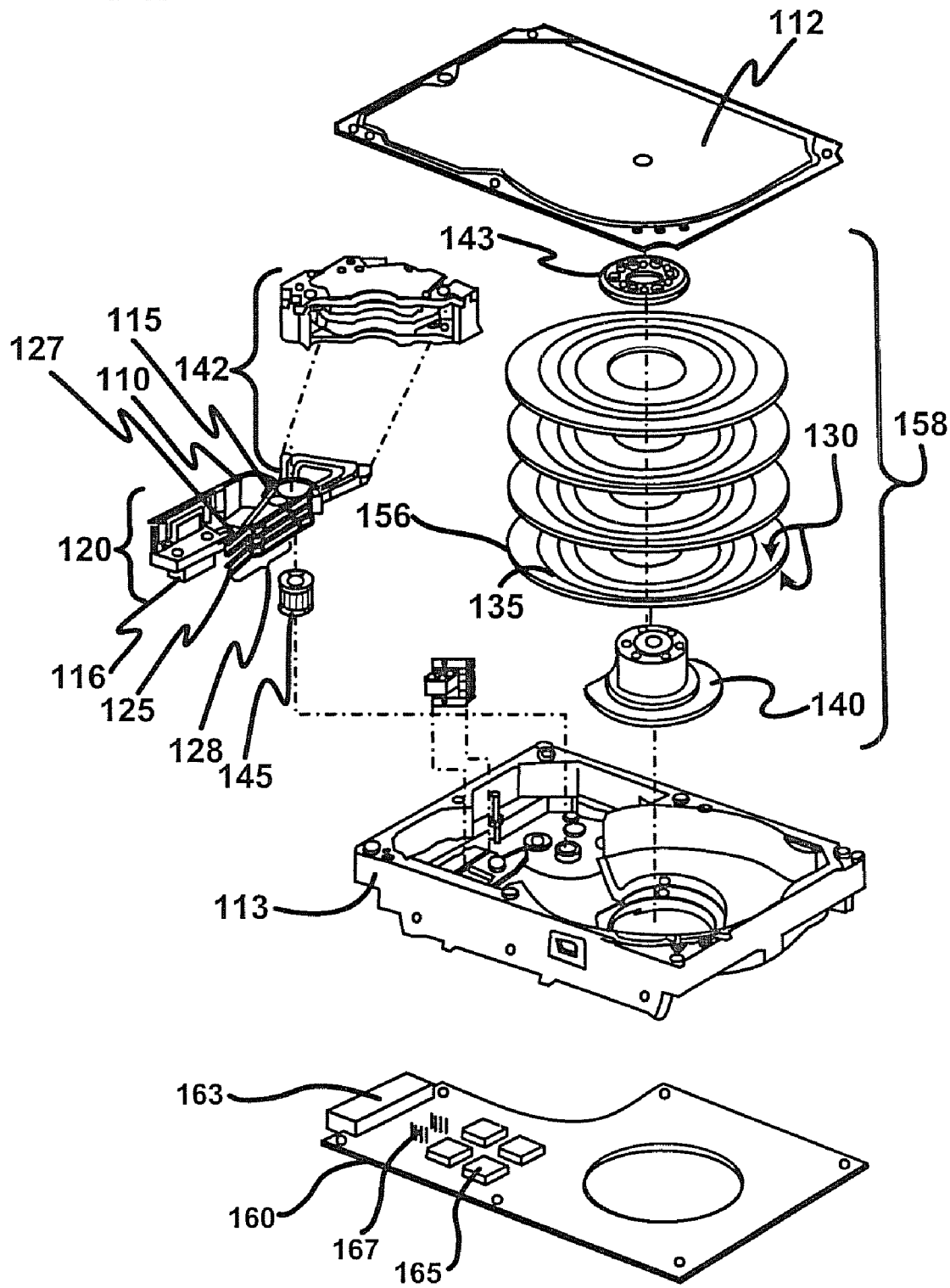
FIG. 1 is an isometric blow-apart of an HDD in accordance with one embodiment.

The drawings referred to in this brief description should be understood as not being drawn to scale unless specifically noted.

DESCRIPTION OF EMBODIMENTS

Reference will now be made in detail to several embodiments of the present invention, examples of which are illustrated in the accompanying drawings. While the embodiments of subject matter discussed herein will be described in conjunction with various embodiments, it will be understood that they are not intended to limit the embodiments of subject matter to these embodiments. On the contrary, the presented embodiments are intended to cover alternatives, modifications and equivalents, which may be included within the spirit and scope of the various embodiments as defined by the appended claims. Furthermore, in the following description of embodiments, numerous specific details are set forth in order to provide a thorough understanding of embodiments of the subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the description of embodiments, discussions utilizing terms such as "receiving," "measuring," "feeding back," "providing," "injecting," "utilizing," "controlling," "demodulating," or the like, typically refer to the actions and processes of a hard disk drive, Application Specific Integrated Circuit, hard drive controller, microcontroller, processor, or similar electronic computing device or combination of such devices. The hard disk drive (HDD), microcontroller, arm electronics (AE), front end electronics (FEE), or a similar electronic computing device controls, manipulates, and transforms data and signals represented as physical (electronic) quantities within the HDD's/AE's/FEE's/microcontroller's/electronic device's registers and memories and components, into other data and signals similarly represented as physical quantities within the HDD's/AE's/FEE's/microcontroller's/electronic device's memories or registers or other such information, voltage, signal processing, storage, and/or control components.

Overview of Discussion

Computers have become part of every day life, and as such, expectations and demands continually increase for greater speed for manipulating data and for holding larger amounts of data, while being more compact and consuming less energy. To meet these demands for increased performance, the electromechanical assembly in a computer, specifically the Hard Disk Drive (HDD) has undergone many changes so that more data can be stored in smaller spaces and so that data can be stored and retrieved more quickly and efficiently. One aspect of these changes includes a reduction in the flying height of the head of a slider over the surface of a disk.

As flying heights diminish, it becomes more relevant to accurately control the slider fly height. Due to low fly heights, in the nanometers, disk micro-waviness and disk slider fly height. Due to low fly heights, in the nanometers, disk micro-waviness and disk lubricant moguls are factors that alter the topography of the surface of a disk enough to significantly alter a slider's fly height above a disk surface, even within a single revolution of a disk. Other factors, such as temperature and altitude at which a disk drive operates, can also alter the flying height of a slider in a significant manner. For example if a hard disk drive is operated at a high temperature or high altitude or both, flying height of the slider may decrease unless there is some sort of active control. As such, the active fly height control using radio frequency feedback, as described herein, is useful for constantly monitoring and actively controlling fly height in a manner that is unaffected by variables such as temperature and altitude and which can quickly sense and react to minute disk surface variations such as micro-waviness and lubricant moguls/buildup.

A method and system are described herein which allow for active fly height control of the slider using feedback on radio frequency signals received from the slider. As an overview, the amplitude of a certain amplitude modulated portion of the received RF signal varies in a somewhat inverse relationship with respect to the fly height. To a point, this amplitude increases as fly height decreases; this allows a particular amplitude to be associated with a particular fly height. In some embodiments, modulation of this received modulated RF signal is induced by injecting a modulating signal into the slider. An amplitude associated with a desired fly height can be predetermined (such as via testing). Feedback on the amplitude of the of this portion of the received RF signal can be used to control the level of a thermal fly-height control voltage supplied to a TFC heater coil on the slider to maintain this desired amplitude. This controls the level of protrusion of the TFC heater coil, and thus actively controls flying height of the slider by changing the size of this protrusion. This is an all electronic means for active fly height control which can be utilized within an HDD (Hard Disk Drive) during reading, writing, or during a time when the slider is idly flying above the surface of a disk.

The discussion will begin with a brief overview of a hard disk drive (HDD) which comprises an RF feedback active fly height control system. An example RF feedback active fly height control system will be described along with some example signal paths within a slider. Operation of the example RF feedback active fly height control system will then be described in more detail in conjunction with description of an example method of actively controlling slider fly height. Finally, some example data is presented in order to more fully describe the method and system and the RF signals involved.

Example Hard Disk Drive

Figure 2:
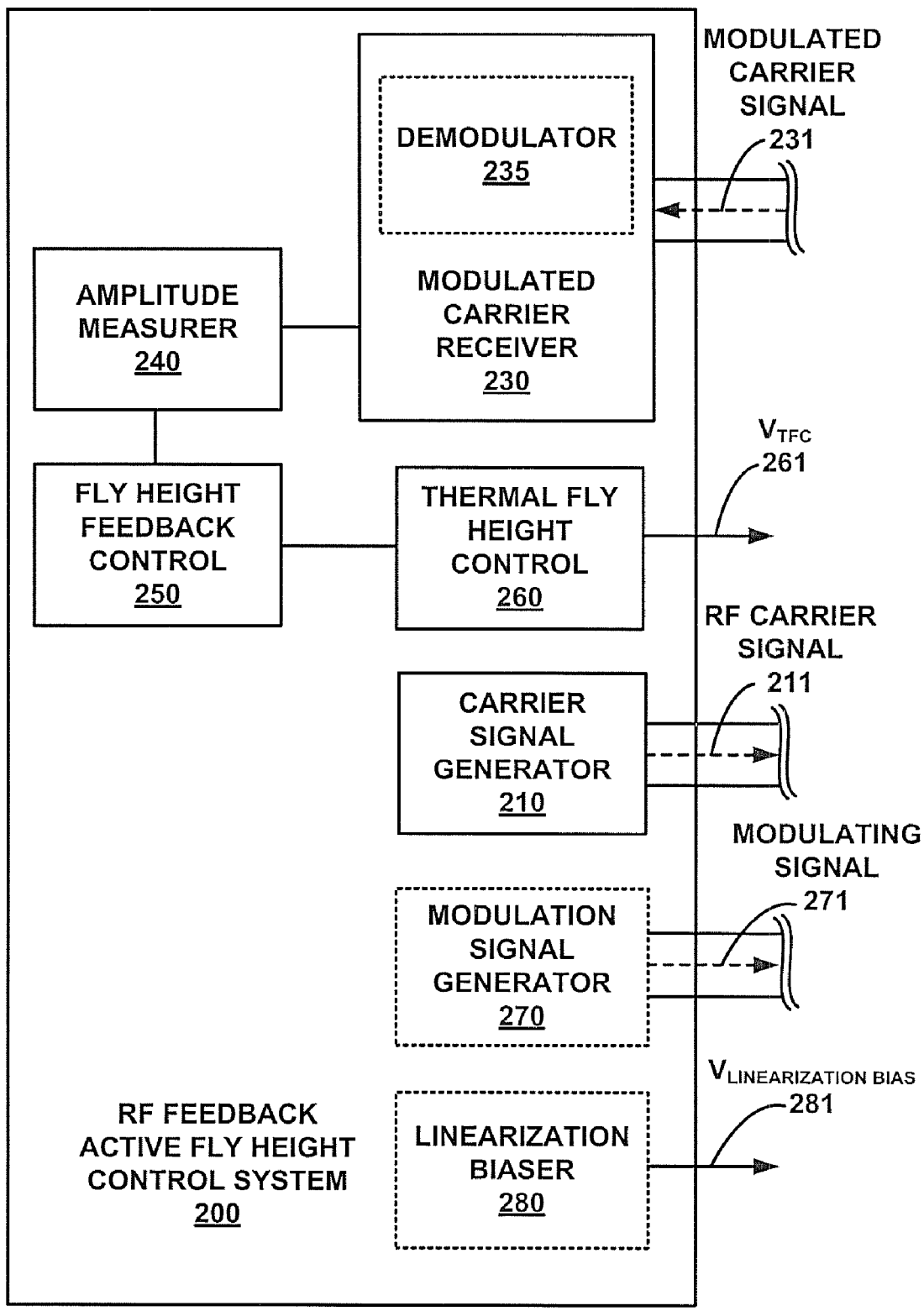
FIG. 2 is an example radio frequency (RF) feedback active fly height control system, in accordance with one embodiment.

With reference to FIG. 1, an isometric blow-apart of HDD 100 is presented in accordance with an embodiment of the present invention. Base casting 113 provides coupling points for components and sub-assemblies such as disk stack 158, voice coil motor (VCM) 142, and head stack assembly (HSA) 120. Disk stack 158 is coupled with base casting 113 by means of motor-hub assembly 140 and disk clamp 143. Motor-hub assembly 140 will have at least one disk 156 coupled with it such that disk 156 can rotate about an axis common to motor-hub assembly 140 and the center of disk 156. Disk 156 has at least one disk surface 130 upon which reside data tracks 135, HSA 120, at times referred to as an actuator assembly or carriage, comprises suspension 127, which suspends hard disk drive slider 125 next to disk surface 130, and HSA connector 116. Hard disk drive slider 125 includes one or more magnetic transducers or heads which read data from and write data to data tracks 135. Suspension 127 and hard disk drive slider 125 comprise head gimbal assembly (HGA) 128. Flex cable 110, which is part of HSA 120, conveys data between HSA connector 116 and arm electronics (AE) module 115. AE module 115 controls read and write operations, in an embodiment, includes RF feedback active fly height control system 200 (FIG. 2). HSA connector 116 also conveys control data between printed circuit board (PCB) 160 and VCM 142.

HSA 120 is coupled pivotally with base casting 113 by means of pivot bearing 145, such that VCM 142 can move HGA 128 with slider 125 arcuately (in an arc like manner) across disk surface 130, accessing data tracks 135. Upon assembly of HSA 120, disk stack 158, VCM 142, and other components with base casting 113, cover 112 is coupled with base casting 113 to enclose these components and sub-assemblies into HDD 100.

Once cover 112 is coupled with base casting 113, PCB 160 is coupled to base casting 113. PCB 160 comprises at least one electrical component 165 which in general performs the electrical tasks of HDD 100, such as status check of HDD 100 before writing data, power control for motor-hub assembly 140, and servo control of VCM 142. VCM 142 is electrically coupled with PCB 160 via HSA connector 116 and an appropriately mating connection 167 on PCB 160. Electrical coupling of HDD 100 to a host system in which HDD 100 operates is enabled in part through PCB connector 163, coupled to PCB 160. It is appreciated that PCB 160 and/or electrical component 165 can be configured in other manners and located in other locations, in other embodiments.

The displayed configuration of HDD 100 is shown by way of example and not of limitation. It is appreciated that in some embodiments, one or more components of HDD 100 can be interchanged or shared between subassemblies while maintaining the spirit of the definitions of the aforementioned assemblies and subassemblies.

Example RF Feedback Active Fly Height Control System

FIG. 2 is an example Radio Frequency (RF) feedback active fly height control system 200 ("system 200") in accordance with one embodiment. In one embodiment, system 200 uses radio frequency (RF) signals injected into a slider, such as slider 125, to assist in determining/actively controlling a fly height of slider 125 above a surface, such as surface 130, of a disk such as one of disks 156. In various embodiments, system 200 is implemented as a portion of AE module 115 or front end electronics. This can comprise implementation within an integrated circuit, such as, for example, an Application Specific Integrated Circuit (ASIC). In some embodiments, system 200 is included in a hard disk drive such as HDD 100.

As depicted in FIG. 2, in one embodiment, RF feedback active fly height control system 200 comprises a carrier signal generator 210, a modulated carrier receiver 230, an amplitude measurer 240, a fly height feedback control 250, and a thermal fly height control (TFC) 260. In some embodiments, 200 also comprises one or more of a modulation signal generator 270, and a linearization biaser 280. In some embodiments, system 200 also includes a demodulator 235, which may be included in modulated carrier receiver 230.

Carrier signal generator 210, in one embodiment, generates an RF carrier signal 211 and injects RF carrier signal 211 into a slider, such as slider 125 of hard disk drive 100. Numerous examples of injection paths for RF carrier signal 211 are discussed and illustrated below (e.g., in FIG. 3, FIG. 4A, and FIG. 4B). As will be described further below, an injected carrier signal is injected into slider 125 so that it can become modulated and then received back from slider 125 as a modulated carrier signal.

In some embodiments, signal 211 is a high frequency RF signal. An example of a high frequency signal is a signal above approximately 10 MHz in one embodiment. In one embodiment, signal 211 is in the range of approximately 10 Mhz to 10 GHz. In various embodiments herein, signal 211 is shown by way of example (and not of limitation) as being approximately 1 GHz. In some embodiments RF carrier signal 211 is selected to be out-of-band above a frequency band of read data and control signals in a hard disk drive, such as HDD 100, in which system 200 is utilized. Consider an embodiment where the read data and control signals of HDD 100 are in the range of approximately 100 MHz to 3.5 GHz. In such an embodiment, carrier signal generator 210 generates RF carrier signal 211 at a frequency above 3.5 GHz, such as at approximately 4 GHz. Following this example, such an RF carrier signal 211 does not interfere with the read data and control signals of HDD 100. Moreover, in one embodiment where an out-of-band RF carrier signal 211 is used, modulation of RF carrier signal 211 is also taken into account when selecting the frequency of RF carrier signal 211. For example if RF carrier signal 211 is to be modulated such that a sideband is generated a 200 KHz below RF carrier signal 211, then RF carrier signal 211 is generated at a frequency high enough above the frequency band of read data and control signals that such a lower sideband does not fall into the frequency band of the data and control signals.

Modulated carrier receiver 230 receives a modulated radio frequency (RF) carrier signal 231 from a slider. Numerous examples of receiving paths for receiving modulated RF carrier signal 231 are discussed and illustrated below (e.g., in FIG. 3, FIG. 4A, and FIG. 4B). The received modulated RF carrier signal 231 comprises an amplitude modulated component (such as a sideband) which is modulated onto the modulated RF carrier signal 231 by vibration of the slider. In some embodiments, modulated carrier receiver 230 provides modulated RF carrier signal 231 to amplitude measurer 240. In some embodiments, modulated carrier receiver 230 demodulates all or some portion of the amplitude modulated signal(s), which are modulated onto modulated RF carrier signal 231, in order to achieve/produce a demodulated signal.

The modulated RF carrier signal 231 received by modulated carrier receiver 230 (or in some embodiments a demodulated version of it or a component of it) is provided to amplitude measurer 240. Consider an embodiment where modulated RF carrier signal 231 is amplitude modulated with frequencies of interest which are located in a frequency range which is 100 kHz-300 kHz above and below RF carrier signal 211. In one embodiment, all or some portion of this range or these ranges near RF carrier signal 211 is provided to amplitude measurer 240. In one embodiment, this can comprise filtering (such as with a bandpass filter) and/or demodulating a component (such as a sideband or portion thereof) which is in the range of 100 kHz-300 kHz above and/or below RF carrier signal 211 and providing this filtered and/or demodulated portion to amplitude measurer 240. It is appreciated that RF carrier signal 211 can be modulated into modulated RF carrier signal 231 by natural vibrations of slider 125 during flying operations (e.g., at the pitch two mode of vibration of a slider). It is also appreciated that RF carrier signal 211 can be modulated into modulated RF carrier signal 231 by slider vibrations (modulations) which are electrostatically induced by a modulating signal 271 (e.g. an alternating current signal) which has been injected into slider 125. In some embodiments, modulating signal 271 is selected to cause slider 125 to modulate at approximately its pitch two mode of vibration.

In some embodiments, modulated carrier receiver 230 includes demodulator 235. Demodulator 235, when included, demodulates one or more amplitude modulated component of modulated RF carrier signal 231 to achieve or produce a demodulated signal. This can comprise demodulating one or more amplitude modulated sidebands (upper, lower, or both), which are modulated onto the carrier of modulated RF carrier signal 231. In one embodiment, this comprises demodulating at least one portion of a sideband which is located approximately 100-300 kHz away from the carrier frequency of modulated RF carrier signal 231. Demodulator 235 provides the demodulated signal to amplitude measurer 240. It is appreciated that in some embodiments, when included, demodulator 235 or its functions may be exist apart from modulated carrier receiver 230 or be included in some other component of system 200.

Amplitude measurer 240 is coupled with modulated carrier receiver 230 and measures an amplitude associated with an amplitude modulated component associated with the received modulated RF carrier signal 231. In various embodiments, this can comprise measuring the amplitude of this amplitude modulated component while it is still modulated onto a carrier or after it has been demodulated into a demodulated signal. As will become more apparent, the amplitude which is measured has a strong inverse correlation with the flying height of a slider from which it is measured. Thus, a particular amplitude can be pre-associated (such as by modeling or testing) with a particular fly height of a slider 125 above a surface 130 of a disk 156. In one embodiment, by way of example and not of limitation, an amplitude corresponding to a received modulated power of −80 dBm may be associated with a fly height of 5 nm.

Spectrum analysis of a range of frequencies produces a power spectrum comprising amplitudes associated with constituent frequencies in the analyzed range of frequencies. In some embodiments, amplitude measurer 240 produces a power spectrum of all or some portion of the range of frequencies in the signal received from modulated carrier receiver 230. In one embodiment, a range of frequencies to be analyzed can be selected, such as with a band pass filter. Consider an embodiment where a carrier frequency of 1 GHz is modulated with sidebands 250 kHz above and below the carrier. In one such embodiment, amplitude measurer 240 utilizes a 0.99975 GHz to 1.00025 GHz band pass filter and a Fast Fourier transform (FFT) to accomplish the spectrum analysis and production of the power spectrum. The amplitude corresponding to the received power (dBm) of any signal in this power spectrum can then be determined. In another such embodiment, amplitude measurer 240 measures amplitude of the modulated portions using a specialized amplitude measuring circuit such as a CMOS (Complementary metal-oxide-semiconductor) circuit which includes a band pass filter at a specific or selectable frequency or frequency range. Such special purpose amplitude measuring circuits are commonly used to measure signal amplitude in portable pagers and can be adapted for amplitude measurement of a frequency or frequency range of modulated RF carrier signal 231.

Fly height feedback control 250 is coupled with amplitude measurer 240 and is configured for feeding back on the amplitude measured by amplitude measurer 240 in order to control generation of a thermal fly height control (TFC) voltage. The generation of the TFC voltage 261 which is applied to slider 125 is controlled such that a selected amplitude of the amplitude modulated component is achieved and maintained. In one embodiment, fly height feedback control 250 comprises a digital, analog, or combination analog-digital circuit which compares a measured amplitude (received as feedback from slider 125) as measured by amplitude measurer 240 with a preselected and desired amplitude and then generates an appropriate control signal to instruct TFC 260 to adjust a TFC voltage (up, down, or not at all) as required to cause the measured amplitude from the slider to achieve or maintain the pre-selected amplitude value.

In one embodiment, modulation signal generator 270, when included, generates a modulating signal 271 as an alternating current signal and injects it into slider 125 to electrostatically modulate slider 125. This causes RF carrier signal 211 to be amplitude modulated into modulated RF carrier signal 231. The amplitude of the amplitude modulation is somewhat inversely correlated to the fly height of slider 125. More specifically, the amplitude increases as fly height decreases, with the amplitude leveling off or decreasing slightly when contact is achieved. This is because the distance between the thermally protruded head (by action of TFC) to disk surface is decreased, augmenting the capacitance from the head protrusion to the disk surface. As the amplitude is predictable and repeatable, a particular amplitude of the amplitude modulated component can be associated with a particular slider fly height.

In some embodiments, modulating signal 271 is selected such that it causes slider 125 to modulate at approximately the pitch two mode frequency of vibration of slider 125. In some embodiments, the modulating signal 271 is out-of-band below the frequency band of read data and control signals in a hard disk drive. This can be useful for minimizing the possibility of interference, such as, for example, in an embodiment where modulating signal 271 is injected via read data lines of slider 125. In some embodiments, a generated modulating signal 271 is also outside of the frequency band of write data signals. Due to being out-of-band, this modulating signal does not interfere with read/write/control operations of a slider when it is injected into the body of a slider, such as slider 125. It will be obvious to those skilled in the art that in the special case where the RF feedback active fly height control system is only used at moments when the hard disk is not writing or reading, e.g. at boot time or predetermined schedule, the RF carrier signal and the modulating signal may be in-band, since there will be no interference with reading and/or writing operation in such a case.

Modulating signal 271 causes an electrostatic modulation of slider 125. This modulation may be very small, such as a vibration of only a few angstroms. In various embodiments, the modulating signal 271, which is injected into a slider, is at a frequency of ~100 kHz, ~200 kHz, approximately the pitch two mode of vibration of a slider, or approximately ½ the pitch two mode frequency of vibration of a slider. In some embodiments, other frequencies are utilized for modulating signal 271. In some embodiments, modulating signals 271 at a plurality of different frequencies are generated by modulation signal generator 270 and then injected into slider 125. In one embodiment, for example, modulating signals can be injected at both the frequency of pitch two mode vibration of a slider and half of the frequency of pitch two mode vibration of a slider. It is appreciated that other combinations of modulating signals can be injected in other embodiments.

Consider, for example, a slider 125 which has pitch two mode frequency of vibration of approximately 200 kHz. In one embodiment, a modulating signal 271 of approximately 100 kHz causes an electrostatic modulation of slider 125 at harmonic of approximately 200 kHz. This 200 kHz modulation is a harmonic of the 100 kHz modulating frequency and is at or near a frequency associated with pitch two mode vibrations of slider 125. In one embodiment, a different modulating signal 271 can be generated and injected to achieve the same results. For example, a modulating signal 271 of approximately 200 kHz can also cause an electrostatic modulation of slider 125 at approximately 200 kHz if a small direct current linearization voltage is applied to slider 125 contemporaneous with its injection.

Thermal Fly height control (TFC) 260 is coupled with and operates under the control of fly height feedback control 250. TFC 260 generates a TFC voltage 261 and applies it to a heater coil of slider 125. In general, by increasing and decreasing TFC voltage ($V_{TFC}$) 261 a portion of slider 125 is caused to expand (when the heater coil is excited and heated) and contract (back toward its unexcited/unheated size when voltage is to the heater coil is lowered or removed). Flying height of slider 125 above disk surface 130 is actively controlled by increasing TFC voltage 261 to bring slider 125 closer to disk surface 130 or decreasing TFC voltage 261 to cause slider 125 to fly further away from surface 130. The expansion and contraction happens very quickly in response to changes in TFC voltage 261, allowing rapid response to feedback. Because the amplitude measured by amplitude measurer 240 is related to the flying height, generation of TFC voltage 261 can be controlled by feedback on the measured amplitude to achieve/maintain a preselected amplitude associated with a selected fly height of slider 125 above a surface 130 of a disk 156. The preselected amplitude can be selected automatically or manually based on an operating condition of the HDD, as a factory preset to maintain a particular fly height of slider 125, or based on some other criteria.

Linearization biaser 280 is coupled with the body of slider 125. Linearization biaser 280 operates in conjunction with modulation signal generator 270, in some embodiments, to generate a direct current (DC) linearization bias voltage ($V_{LINEARIZATION\_BIAS}$) 281 which is applied to the body of slider 125. Linearization refers to causing modulation at the first harmonic or fundamental frequency of the injected modulating signal rather than at a second or other harmonic of the signal. Linearization is used in some embodiments, as it may be easier or less complex to develop a first harmonic feedback system rather than a second harmonic feedback system. In one embodiment, DC linearization bias voltage 281 is a small voltage in the range of approximately +1 volt to −1 volt. DC linearization bias voltage 281 is generated and applied to the slider body in several embodiments. One situation in which DC linearization bias voltage 281 is generated and applied is when slider 125 has no DC potential or an insufficient DC potential to allow modulation of slider 125 at a first harmonic of an applied modulating signal 271. Consider an embodiment, where modulation is desired at 200 kHz and a modulating signal of 200 kHz is applied. Linearization biaser 280 generates and applies DC linearization bias voltage 281 to allow modulation of slider 125 to take place at a first harmonic of the applied modulating signal 271 (i.e. so that modulation can occur at the same frequency as the applied modulating signal 271). In some embodiments, a sufficient DC bias of slider 125 may exist, such as due to contact potential difference between slider 125 and disk surface 130, to eliminate the necessity of applying a DC linearization bias voltage 281.

Example Signal Paths Through a Slider

Figure 3:
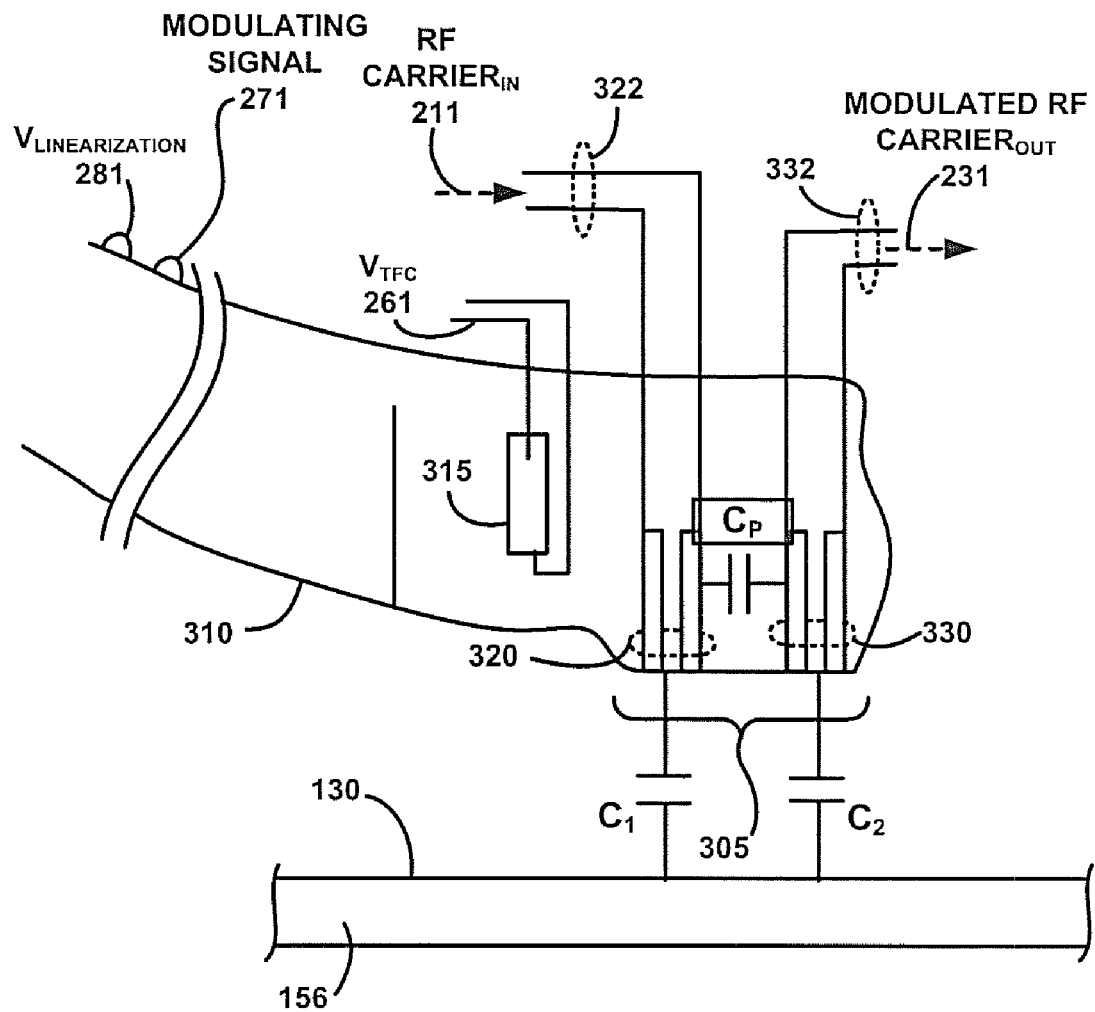
FIG. 3 shows an example of signal paths through a slider, according to one embodiment.

FIG. 3 shows an example of signal paths through a slider 125, according to one embodiment. In one embodiment, slider 125 is the same as or similar to slider 125, of FIG. 1. A head region 305 (often generically referred to as the "head" of slider 125) includes read and write heads which are used to read data from and write data to disk 156. In operation head region 305 is typically placed in close proximity to disk surface 130 during read and write operations. Moreover, head region 305 is typically located on a portion of a slider (e.g., the trailing edge) which is designed to be in the closest proximity to disk surface 130 during flying operation of slider 125 above disk surface 130.

With continued reference to FIG. 3, RF carrier signal 211 is shown being injected in differential mode into the existing reader lines 322 which are coupled to reader element (read head) 320. In differential injection, a signal is injected over a set of lines causing equal amplitude but opposite phase oscillations of voltage offset in each line of the set of lines used for injection or reception. For example, RF carrier signal 211 is injected, in one embodiment, into reader lines 322 via an interconnect which exists at the arm electronics end of slider 125. RF carrier signal 211 is capacitively coupled from reader element 320 to writer coil (write head) 330 via capacitor $C_P$ which is an effective capacitance that exists between reader element 320 and writer coil 330. RF carrier signal 211 is also capacitively coupled from reader element 320 to writer coil (write head) 330 via a path from reader element 320 through effective capacitor $C_1$ to surface 130 and back through effective capacitor $C_2$ to writer coil 330. It is appreciated that capacitors $C_P$, $C_1$, and $C_2$ are not actual capacitors, but rather models of effective capacitances which exist between "plates" of reader element 320, writer coil 330, and disk surface 130. These "plates" are separated by small distances either within slider 125, or between portions of slider 125 and disk surface 130.

RF carrier signal 211 is modulated as it travels through slider 125 due to slider 125 being vibrated/modulated by natural and/or induced modulation of slider 125. The modulated RF carrier signal 231 is conveyed out of slider 125 via existing writer lines 332 which are coupled to writer coil 330. In one embodiment, the modulation of RF carrier signal 211 to produce modulated RF carrier signal 231 occurs due to the natural vibrations of slider 125 as it flies above surface 130. In one embodiment, such natural vibrations are associated with pitch 2 mode vibrations of slider 125. For example, in one embodiment such pitch 2 mode vibrations occur at approximately 200 kHz in slider 125 and cause a modulation approximately 200 kHz above and below the frequency of RF carrier signal 211. In one embodiment, the modulation of RF carrier signal 211 to produce modulated RF carrier signal 231 occurs due to electrostatic vibrations of slider 125 which are caused by modulating signal 271. In one embodiment, modulating signal 271 causes the slider to vibrate at approximately 200 kHz, thus modulating a signal approximately 200 kHz above and below the frequency of RF carrier signal 211. In one embodiment, modulating signal 271 is injected into slider body 310. In other embodiments, modulating signal 271 is injected on one or more existing signal lines (e.g., reader lines, writer lines, or the like) and/or special purpose signal lines which couple slider 125 with modulation signal generator 270. In one embodiment, modulating signal 271 is injected on the same signal lines as RF carrier signal 211.

It is appreciated that other existing or special purpose signal lines besides reader lines 322 and writer lines 332 can be used, in some embodiments, to inject RF carrier signal 211 into slider 125 and/or to convey modulated RF carrier signal 231 out of slider 125. It is also appreciated that the path illustrated in FIG. 3 can be reversed, and that RF carrier signal 211 can be injected in differential mode on writer lines 332 while modulated RF carrier signal 231 is conveyed out of slider 125 via reader lines 322. Moreover, in one embodiment, RF carrier signal 211 can be injected on one set of signal lines and modulated RF carrier signal 231 can be conveyed out of slider 125 on the same set of lines. In one embodiment, RF carrier signal 211 is injected in an alternating fashion on reader lines 322 when writing and on writer lines 332 when reading. In one such embodiment, modulated RF carrier signal 231 is received from reader lines 322 when reading and from writer lines 332 when writing. As a stronger signal is injected and a weaker signal is returned, alternating injection in such a fashion further reduces the chance of interference with the operation of a hard disk drive such as HDD 100, and in particular reduces the chance of interface with the relatively weak read data signals. As can be seen in FIG. 2, there is a small distance of separation between reader 320 and writer 330. Because of this, the fly height of slider 125 may be slightly different at the reader and the writer. By reading back the modulated RF carrier signal 231 from the reader lines 322, fly height of the reader element 320 portion of the slider can be monitored/controlled. Likewise, by reading back the modulated RF carrier signal 231 from the writer lines 332, fly height of the writer 330 portion of the slider can be monitored/controlled. This independent monitoring/controlling of fly height of the reader or writer can be further enhanced by injecting the RF carrier signal and receiving the modulated carrier signal using the same set of lines of reader or writer respectively.

It is appreciated that an injected signal such as RF carrier signal 211 can be capacitively coupled from read head 320 to write head 330 (or vice versa) via capacitance $C_P$ or via a "reflection" from disk surface 130 through capacitances $C_1$ and $C_2$. Likewise, RF carrier signal 211 can also radiate out of read head 320 and/or write head 330 (depending on how it is injected) and be coupled to disk surface 130 (via capacitances $C_1$ and/or $C_2$) and then be reflected back from disk surface 130 (via capacitances $C_1$ and/or $C_2$) into the same or different signal path from which it was radiated. In various embodiments, it is during this capacitive coupling that RF carrier signal 211 becomes modulated by modulating vibrations of slider 125 into modulated RF carrier signal 231.

As illustrated in FIG. 3, in one embodiment, TFC voltage 261 is coupled to heater coil 315. In one embodiment, DC linearization bias voltage 281 is coupled to slider body 310. In one embodiment, slider body 310 is isolated from ground. It is appreciated that TFC voltage 261 and DC linearization bias voltage 281 can be coupled to slider 125 in this fashion even when other signal injection techniques, signal paths and/or signal lines are utilized to couple RF carrier signal 211 to slider 125 and to convey modulated RF carrier signal 231 out of slider 125.

Examples of Common Mode Signal Injection into a Slider

Figure 4A:
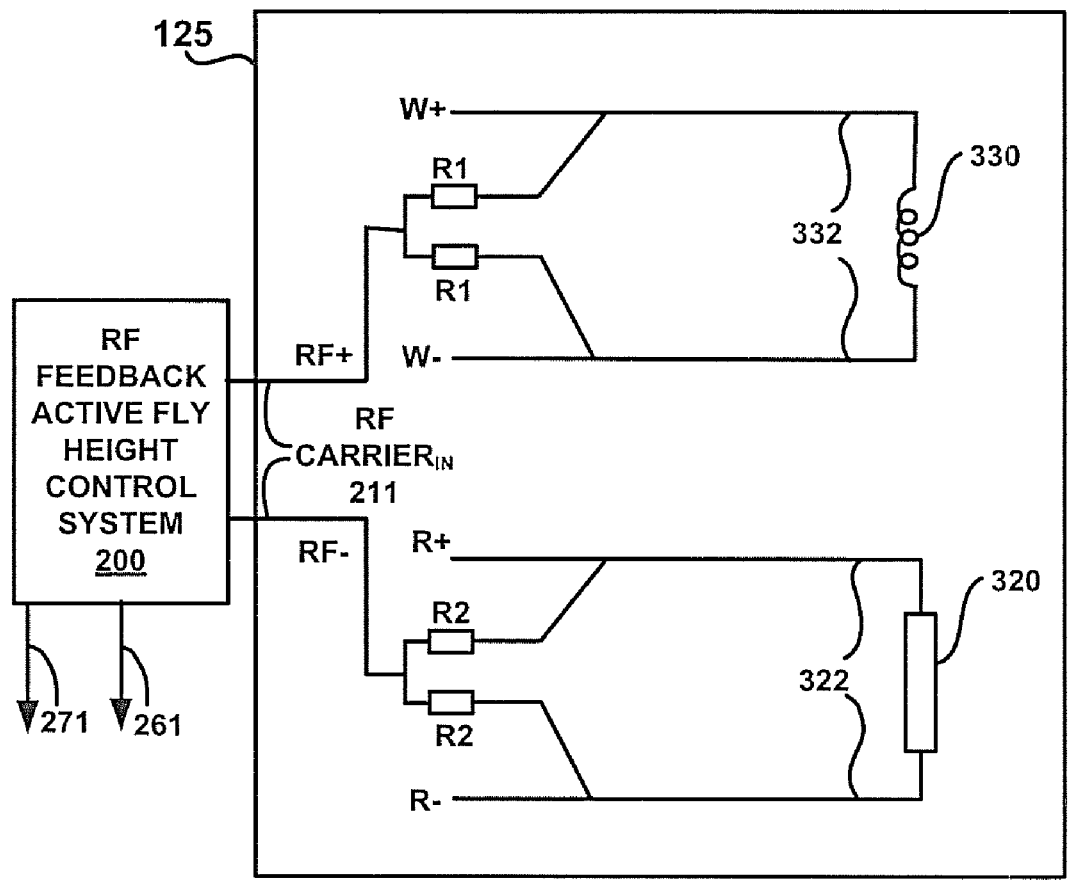
FIGS. 4A and 4B show some examples of common mode signal injection into a slider, according to various embodiments.

FIG. 4A shows an example of common mode signal injection into a slider, according to one embodiment. In one embodiment, slider 125 is the same as or similar to slider 125 of FIG. 1, and slider 125 of FIG. 3. FIG. 4A shows RF carrier signal 211 being injected in common mode into the existing reader lines 322 which are coupled to reader element 320 and into existing writer lines 332 which are couple to writer coil 330. In common mode, half of the RF carrier signal 211 is injected on one set of lines to slider 125 (e.g., RF+ on writer lines 332) while the other half is injected on another set of lines to slider 125 (e.g., RF– on reader lines 322). As shown, in one embodiment, resistors R1 and R2 allow for injection of RF signal without disturbance of the write and read signals. As illustrated, in one embodiment, a pair of lines used for injecting RF+ is also used for conveying write signals W+ and W– and a pair of lines used for injecting RF– is also used for conveying R+ and R–. Those skilled in the art will realize that in the example of embodiment in FIG. 4A, the RF carrier signal is injected into the lines RF+ and RF– and the modulated RF carrier from slider 125 will be received by the same RF+ and RF– lines. This arrangement can use a well known signal combiner/splitter circuit block between slider 125 and the RF feedback active fly height control system 200. It is appreciated that other sets of existing or special purpose signal lines on slider 125 can be utilized, in some embodiments, for common mode injection of RF carrier signal 211.

Common mode injection prevents a voltage differential from existing between either of the reader lines 322, due to the injection of RF carrier signal 211. Common mode injection also prevents a voltage differential from existing between either of the two writer lines 332, due to the injection of RF carrier signal 211. Even though RF carrier signal 211 may be out-of-band of the read data and control signals, in some embodiments, and thus should cause no interference, common mode injection further reduces the possibility of interference with HDD operation. Additionally, interference is also minimized, in both common mode and differential mode injection, due to RF carrier signal 211 being of very low amplitude compared to read data signals, write signals, and control signals used in an operation HDD. Common mode signaling allow for very low voltage levels in the reader in case of unbalance or non-idealities, which helps in protecting the reader sensor.

Figure 4B:
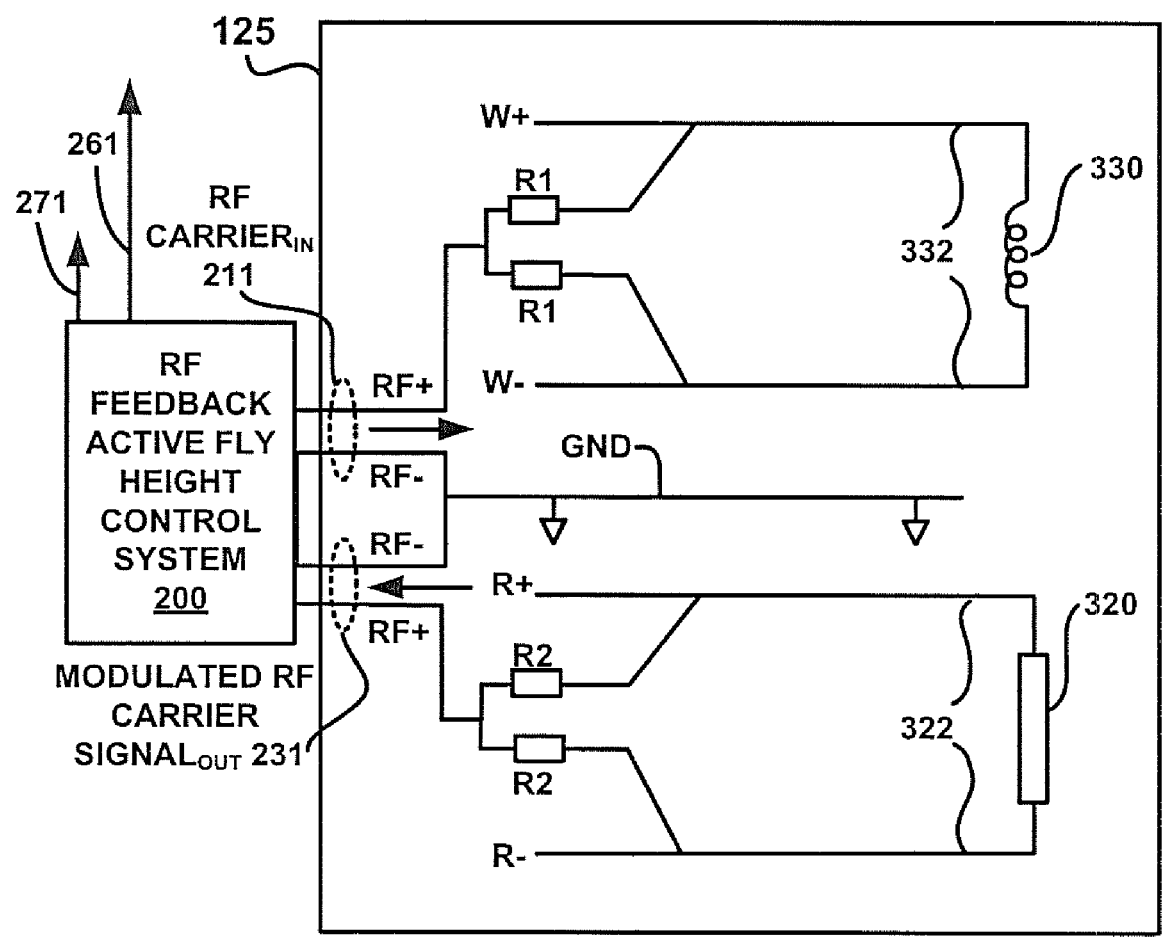

FIG. 4B shows another example of common mode signal injection. In FIG. 4B, the availability of a common ground enables the creation of a two-port signaling scheme to inject and receive signals in common-mode. In FIG. 4B, modulated RF carrier signal 231 is read out in common mode over reader lines 322 while RF carrier signal 211 is injected in common mode over writer lines 332. In one embodiment the RF– portion of RF carrier signal 211 and the RF– portion of modulated RF carrier signal 231 are both coupled to ground. It is appreciated that the arrangement shown in FIG. 4B can be reversed with modulated RF carrier signal 231 read out in common mode over writer lines 332 while RF carrier signal 211 is injected in common mode over reader lines 322. It is also appreciated that signal 211 can be injected in a set of reader and/or writer lines while signal 231 is simultaneously read out of slider 125 via the same signal path used for injection of signal 211. Those skilled in the art will recognize that using the same port for injecting the RF carrier signal and receiving the modulated RF carrier signal allows for independent monitoring and controlling of writer or reader fly height. And, as explained above, the use of the same port for injecting the RF carrier signal and receiving modulated RF carrier signal makes use of a well known signal combiner/splitter circuit block between slider 125 and RF feedback active fly height control system 200.

In various embodiments, modulating signal 271 is injected into slider 125 over a variety of signal paths. In one embodiment, modulating signal 271 is injected into a body of slider 125 in the fashion which has been illustrated and described in conjunction with FIG. 3. In one embodiment, modulating signal 271 is injected in common mode in a similar fashion to the injection of RF carrier signal 211 which has been illustrated and described in conjunction with FIGS. 4A and 4B. In one embodiment, modulating signal 271 is be injected in differential mode via a signal path in a similar fashion to the injection RF carrier signal 211 which has been illustrated and described in conjunction with FIG. 3.

Example of Pitch Two Mode Vibration in a Slider

Figure 5:
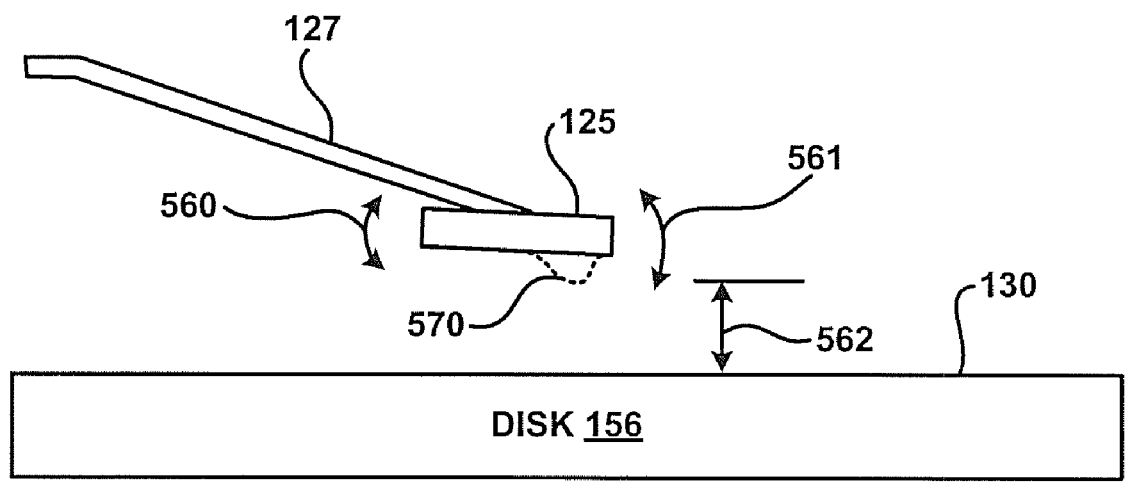
FIG. 5 shows directions of pitch two mode vibration of a slider, according to one embodiment.

FIG. 5 shows directions of pitch two mode vibration of a slider, according to one embodiment. As shown in FIG. 5, suspension 127 suspends slider 125 over surface 130 of disk 156. Protrusion 570 shows an example of how a thermal protrusion can be caused to expand from or contract toward slider 125 through control of TFC Voltage 261. As can be seen, fly height 562 is controlled by how far protrusion 570 does or does not protrude from slider 125. Arrows 560 and 561 show the directions of pitch two mode vibration of slider 125. It is appreciated that some sliders, these pitch two mode vibrations are in the vicinity of 200 kHz, however, this frequency typically varies between different types or models of sliders.

Example Method of Actively Controlling Slider Fly Height

Figure 6:
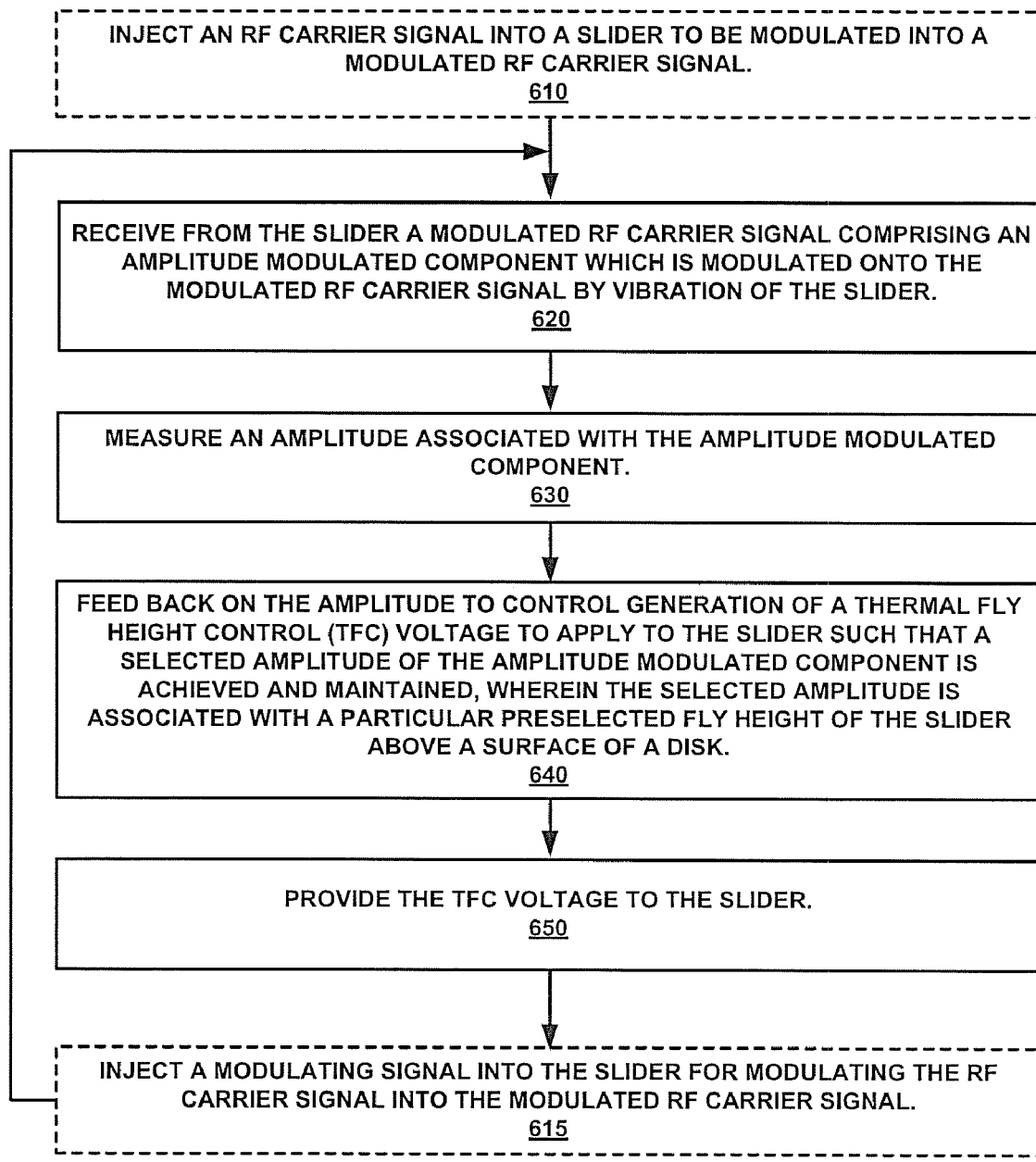
FIG. 6 shows a flow diagram of an example method of actively controlling slider fly height, according to one embodiment.

FIG. 6 shows a flow diagram 600 of an example method of actively controlling slider fly height, according to one embodiment, according to one embodiment. In one embodiment, this method is utilized in a disk drive such as HDD 100 to actively control flying height of a slider, such as slider 125. Reference will be made to FIGS. 1, 2, 3, 4A, 4B, 5, and the diagrams of FIGS. 7-9 in the description of the method of flow diagram 600.

At 610 of flow diagram 600, in one embodiment, the method injects an RF carrier signal into a slider, such as slider 125, to be modulated into a modulated RF carrier signal. For example, in one embodiment, this comprises carrier signal generator 210 of system 200 injecting RF carrier signal 211 into slider 125 so that it can be modulated into modulated RF carrier signal 231. In some embodiments, the modulated RF carrier signal 211 which is injected is out-of band above a frequency band of read data and control signals in a hard disk drive, such as HDD 100, in which slider 125 is operating. An illustration of an out-of-band RF carrier signal is shown in FIG. 7.

Figure 7:
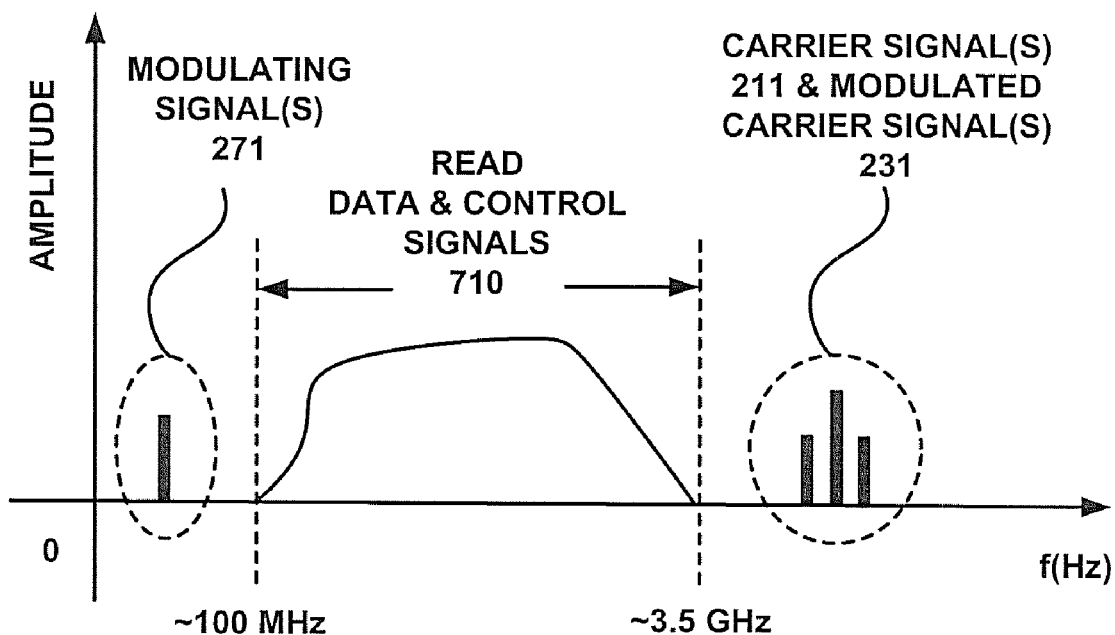
FIG. 7 shows an example of spectrum allocation for out-of-band signals, according to one embodiment.

FIG. 7 shows an example of spectrum allocation for out-of-band signals used according to one embodiment. In FIG. 7, read data and control signals 710 are in the range of ~100 MHz to ~3.5 GHz in a particular HDD, such as HDD 100. As shown, RF carrier signal 211 is at a frequency above the range of signals 710. Additionally, modulated RF carrier signal 231 is also above the range of signals 710 while modulating signal 271 is below the range of signals 710. Following the example illustrated by FIG. 7, in one embodiment, RF carrier signal 211 is at a frequency such as 4 GHz, which is well above the top end of signal range 710. It is appreciated that the range of read data and control signals 710 is shown by way of example and not of limitation, and will typically vary in different models and types of hard disk drives.

In various embodiments, RF carrier signal 211 can be injected via many different signal paths. In some embodiments, RF carrier signal 211 is injected in common mode or in differential mode via signal lines coupled with slider 125. Some examples of the signal paths over which RF carrier signal 211 may be injected into slider 125 are illustrated in and discussed in conjunction with FIGS. 3, 4A, and 4B. In one embodiment, RF carrier signal 211 can be injected via read lines (e.g., reader lines 322) which are coupled with a read head 320 in slider 125. In one embodiment, RF carrier signal 211 can be injected via write lines (e.g., writer lines 332) which are coupled with a write head 330 in slider 125.

For purposes of illustration of 610 of the method of flow diagram 600, in one embodiment, carrier signal generator 210 generates an RF carrier signal of 1 GHz which it injects into slider 125. In one embodiment, for purposes of example and not of limitation, this comprises injecting RF carrier signal 211 into reader lines 322 of slider 125 (as shown in FIG. 3).

At 615 of flow diagram 600, in one embodiment, the method injects an modulating signal into the slider (e.g. slider 125) for modulating the RF carrier signal into a modulated RF carrier signal. In one embodiment, this comprises modulation signal generator 270 injecting modulating signal 271 into slider 125 to modulate RF carrier signal 211. Modulating signal 271 causes electrostatic vibrations within a slider such as slider 125. A variety of signal paths for injecting modulating signal 271 have been illustrated and described in conjunction with FIGS. 3, 4A, and 4B.

In one embodiment, the injecting of modulating signal 271 comprises injecting modulating signal 271 at a frequency which is out-of-band below a frequency band of read data and control signals in a hard disk drive (e.g., HDD 100) in which slider 125 is operating. Referring again to the example illustrated by FIG. 7, in one embodiment, modulating signal 271 is injected at a frequency such as 100 kHz or 200 kHz, which is well below the bottom end of signal range 710. As previously described, range 710 is shown by way of example and not of limitation and can vary in different models and types of hard disk drives.

In one embodiment, the purpose of injecting modulating signal 271 is to induce modulation of slider 125 at or near the pitch two mode frequency of vibration of slider 125, as this is a natural mode of vibration of slider 125 in an up/down fashion relative to surface 130 of disk 156 (see FIG. 5). In one embodiment, this is accomplished by injecting modulating signal 271 at a frequency of approximately one half of a pitch two mode frequency of vibration of slider 125. This causes the slider to vibrate at the second harmonic of the injected signal which, in this case, is the frequency of pitch two mode of vibration of slider 125. In another embodiment, this can be accomplished by injecting modulating signal 271 at a frequency of approximately a pitch two mode frequency of vibration of slider 125 while simultaneously injecting a linearizing direct current (DC) bias voltage into slider 125 to facilitate vibration of slider 125 at a first harmonic of the injected modulating signal 271. It is appreciated that to induce vibration at the fundamental frequency, or first harmonic, of an injected modulating signal 271, a small DC linearization bias voltage 281 may need to be injected by linearization biases 280 if slider 125 has insufficient existing DC voltage potential. In one embodiment, when a sufficient DC voltage potential exists on slider 125, DC linearization bias voltage 281 is not injected. Although, examples have described injecting a single modulating signal 271, embodiments are not so limited. Thus, in one embodiment a plurality of modulating signals 271 at a plurality of different frequencies are injected. Additionally, in some embodiments a signal is injected which causes vibration modulations of slider 125 at some frequency other than the frequency of pitch two mode vibration of slider 125.

In some embodiments, the injecting of modulating signal 271 as described in 615 of flow diagram 600 is omitted. Consider an embodiment where slider 125 has low damping and naturally modulates sufficiently at its pitch two mode of vibration, this natural modulation is sufficient to modulate injected RF carrier signal 211 into modulated RF carrier signal 231. As such, injecting of modulating signal 271 is not necessary or required if it is desired to modulate the injected carrier using only the natural pitch two mode vibrations of slider 125.

It is appreciated that the natural or induced oscillations produce modulation of the value of capacitance (e.g., C1 and/or C2) between slider and disk, by slightly modulating the fly height (e.g. a few angstroms). This capacitance modulation in turn produces modulation of the RF carrier by the modulating signal.

For purposes of illustration of 615 of flow diagram 600, consider an embodiment, where slider 125 has a pitch two mode frequency of vibration of 210 kHz. In one such embodiment, modulation signal generator 270 generates and injects an modulating signal 271 at 105 kHz to affect a modulation of slider 125 at the pitch two mode frequency of vibration. In one embodiment, modulating signal 271 is injected into slider body 310 as shown in FIG. 3.

At 620 of flow diagram 600, in one embodiment, the method receives from a slider a modulated radio frequency (RF) carrier signal comprising an amplitude modulated component which is modulated onto the modulated RF carrier signal by vibration of the slider. For example, this can comprise modulated carrier receiver 230 receiving modulated RF carrier signal 231 from slider 125. A variety of signal paths for receiving modulated RF carrier signal 231 have been illustrated and described in conjunction with FIGS. 3, 4A, and 4B. Modulated RF carrier signal 231 comprises a modulated version of injected RF carrier signal 211 which has been modulated by the injected modulating signal 271 and/or by natural oscillations the slider. As previously described this includes, in one embodiment, receiving modulated RF carrier signal 231 as a reflected signal via an identical signal line/path which was utilized to inject the unmodulated version of the RF carrier signal (i.e. signal 211).

Figure 8:
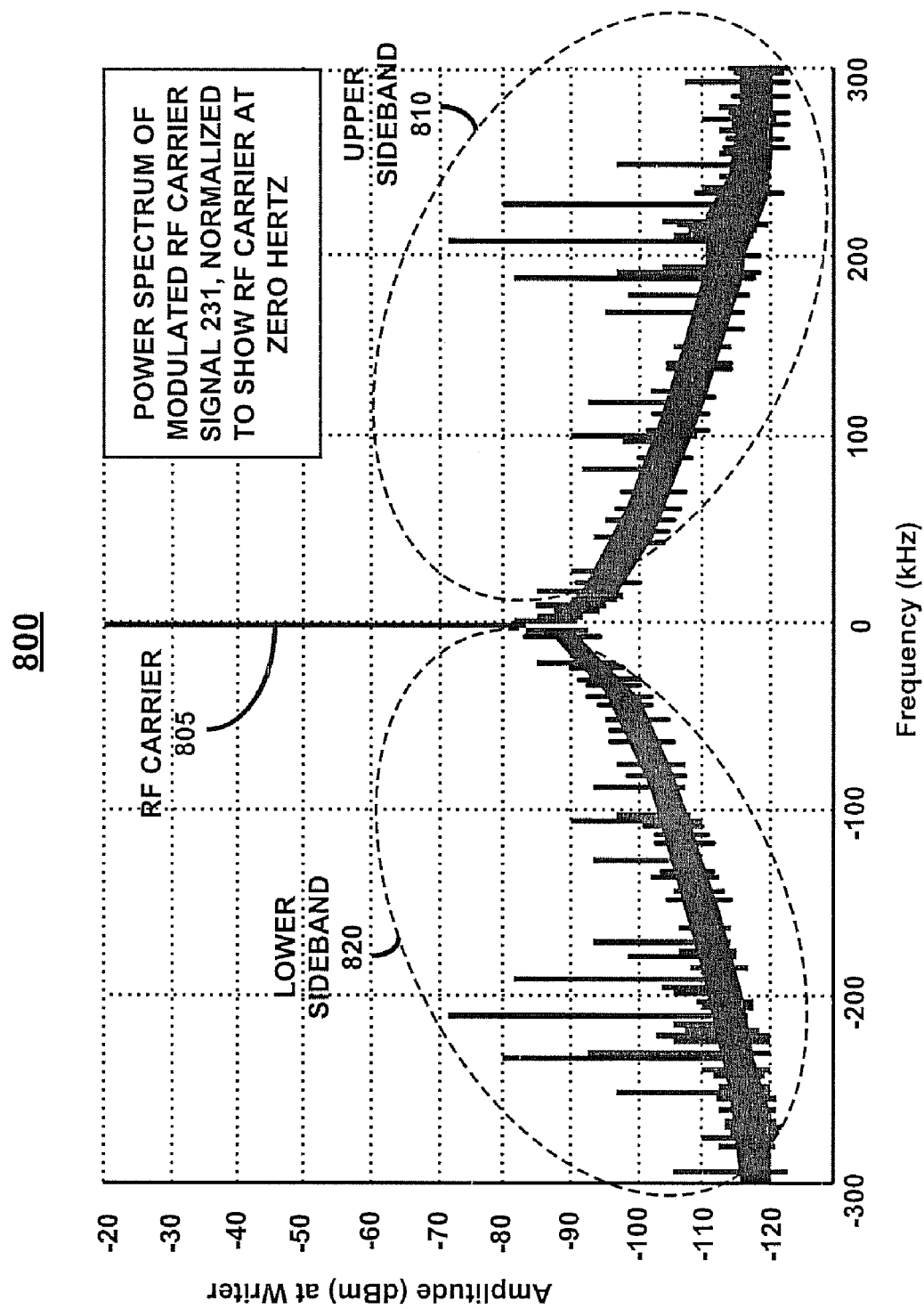
FIG. 8 shows an example of a power spectrum of a modulated RF carrier signal normalized to show the carrier frequency at zero Hertz, according to one embodiment.

FIG. 8 shows an example of a power spectrum 800 of a modulated RF carrier signal normalized to show the carrier frequency at zero Hertz, according to one embodiment. Power spectrum 800 shows a received modulated RF carrier signal 231 which has been normalized to show the carrier signal 805 at zero hertz. It is appreciated that without this normalization, the carrier signal in one embodiment would be centered at a high frequency, such as 1 GHz. In one embodiment, the signals graphed in power spectrum 800 are read out of slider 125 (e.g., from writer lines 332 as shown in FIG. 3). As can be seen slider 125 is amplitude modulated in the vicinity of upper sideband 810 and lower sideband 820. At approximately 210 kHz above and below carrier frequency 805 a spike in the amplitude modulated frequency is seen at the second harmonic of a 105 kHz modulating signal (which is also visible in power spectrum 800). It is appreciated that the amplitude of the spike at 210 kHz increases as fly height of slider 125 decreases. This is a function of the increased capacitance of slider 125 as flying height decreases.

Figure 9:
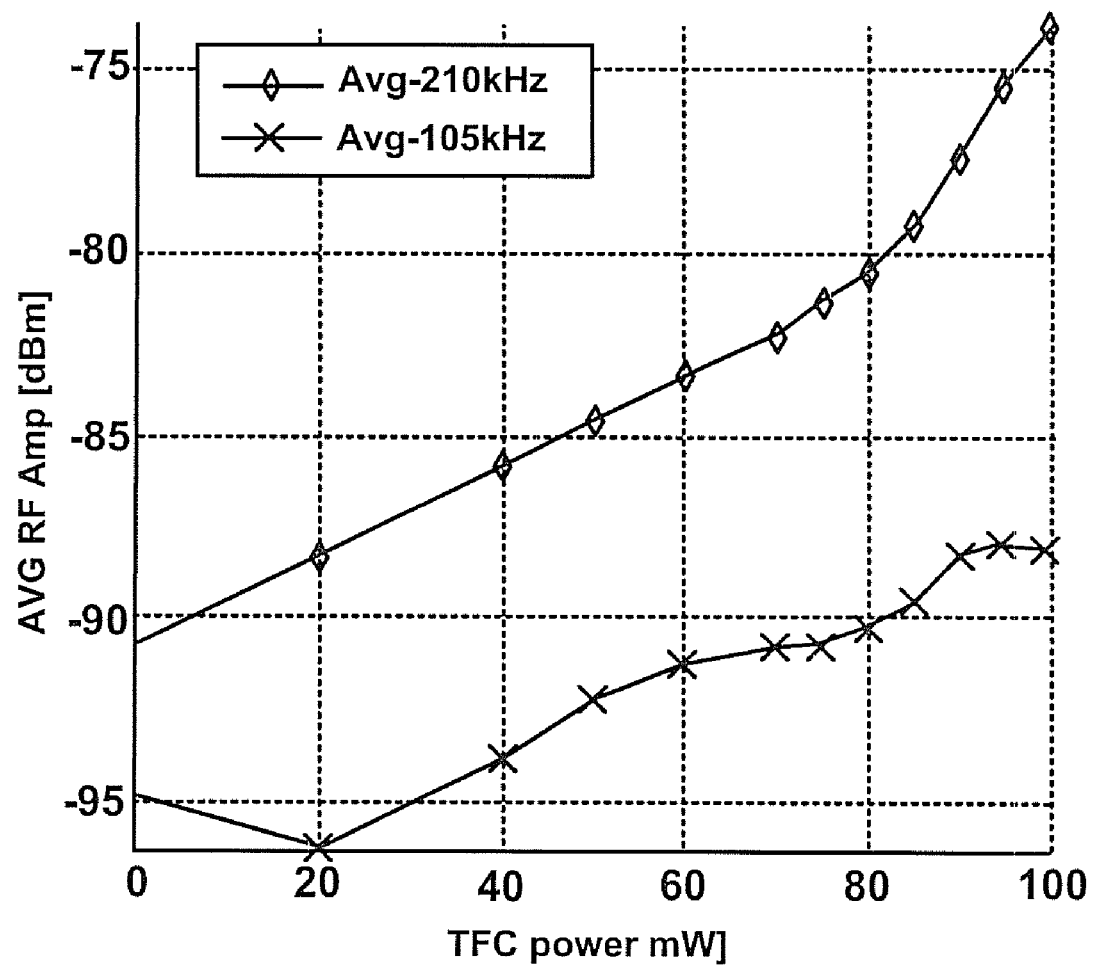
FIG. 9 shows an example of average power of modulated signals, from a modulated RF carrier signal, graphed versus TFC power, according to one embodiment.

FIG. 9 shows an example of average power of modulated signals, from a modulated RF carrier signal, graphed on graph 900 versus TFC power, according to one embodiment. As can be seen, the applied TFC power ranges from 0 mW to 100 mW. In one embodiment, at 0 mw applied TFC power, slider 125 flies at approximately 12 nm above the surface of a disk, while at approximately 95 mW, slider 125 contacts the surface of a disk. As illustrated, the amplitude of the 210 kHz signals (e.g. the 210 kHz signal from upper sideband 810 of FIG. 8) generally increases with increased TFC power and decreased slider fly height. Through empirical testing, use of Wallace spacing equations, and/or other techniques, a correlation between applied TFC power, resultant slider fly height, and read back amplitude of the 210 kHz signal can be established for a particular slider/disk combination. Such correlation will typically be fairly uniform for models of disk drives which used such a combination. Once this correlation is established, a fly height can be achieved by adjusting TFC power to achieve the appropriate amplitude of the 210 kHz signal which is modulated onto RF carrier signal 211. Alternatively, at the hard disk assembly time, the correlation between the amplitude of the received modulated RF signal and fly height of writer and reader can be determined. By a sequence of tests optimal fly height(s) for reader and writer, for instance optimal fly heights for minimizing bit error rate (BER), can be determined and the associated received modulated signal amplitudes recorded. This information can be stored in memory within the hard disk and be used to maintain the writer and reader optimal fly heights in the hard disk across a variety different environment conditions.

Figure 10A:
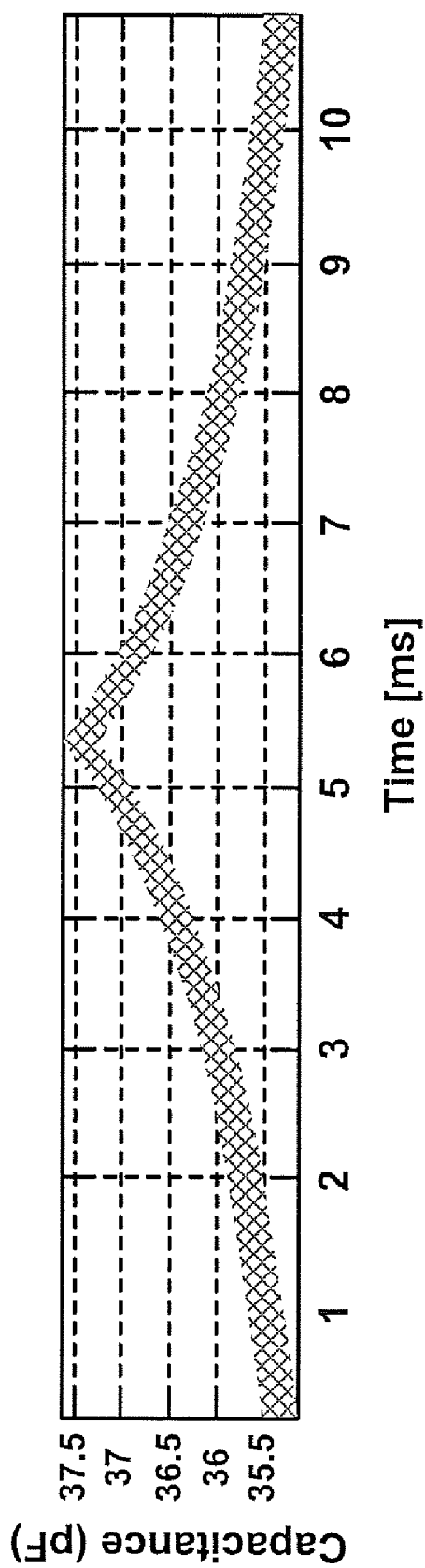
FIGS. 10A and 10B are related graphs showing a relationship between slider capacitance and fly height as fly height of the slider is changed, according to one embodiment.
Figure 10B:
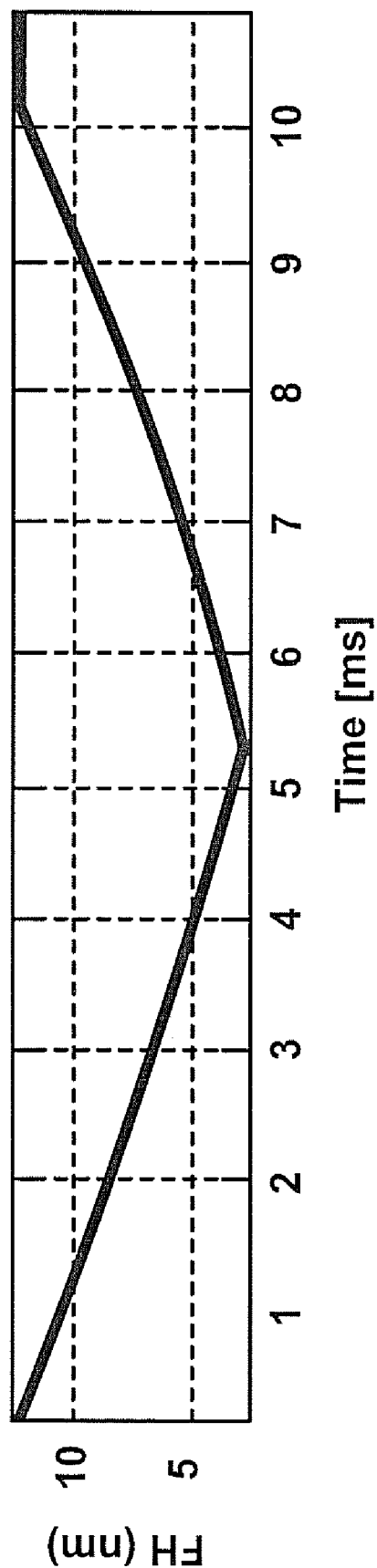

FIGS. 10A and 10B are related graphs showing a relationship between total slider capacitance and fly height as fly height of the slider is changed, according to one embodiment, if the whole slider body including the thermally protruded area were an all conductive solid body. As simulated and with results illustrated in FIGS. 10A and 10B, this slider with an all conductive solid body would have a capacitance to disk interface which would increase slightly as fly height decreases. It should be noted that the capacitance of the head disk interface (e.g., C1 and C2 of FIG. 3) near the read head 320 and write head 330 of slider 125 increases much more dramatically than illustrated in FIGS. 10A and 10B. This difference is explained by observing that the slider is not an all conductive solid body and noting that capacitance C1 and C2 are related to the interface of reader and writer elements to the disk surface, where the reader and writer elements are significantly electrically isolated from the slider body.

At 630 of flow diagram 600, in one embodiment, the method measures an amplitude associated with the amplitude modulated component of modulated RF carrier signal 231. In one embodiment, amplitude measurer 240 measures the amplitude of an amplitude modulated component of RF carrier signal 231. This can comprise amplitude measurer 240 utilizing a bandpass filter, such as a notch filter, to capture a particular frequency range associated with a portion of the amplitude modulated component, such as a sideband. This can also comprise amplitude measurer 240 utilizing a fast Fourier transform to determine a power spectrum associated with the amplitude modulated component. The power spectrum shows the amplitudes and frequencies of the various signals which are represented in the power spectrum. Amplitude measurer 240 measures amplitude associated with received power (e.g., dBm) of one or more signals of the power spectrum. 630 of flow diagram 600 can also comprise amplitude measurer 240 utilizing a special purpose circuit to measure amplitude associated with a pre-determined frequency or band of frequencies, such as a sideband of modulated RF carrier signal 231. In various embodiments, the amplitude modulated component may be modulated on the on signal 231 when the amplitude is measured, or may be demodulated when the amplitude is measured.

Referring again to FIG. 8, graphed power spectrum 800 shows an example of how a power spectrum can be used to measure amplitude of a selected signal within the power spectrum.

At 640 of flow diagram 600, in one embodiment, the method feeds back on the amplitude which has been measured to control generation of a thermal fly height control (TFC) voltage to apply the slider such that a selected amplitude of the amplitude modulated component is achieved and maintained. The selected amplitude is associated with a particular preselected fly height of the slider above a surface of a disk. In one embodiment, this comprises fly height feedback control 250 comparing the measured amplitude received from amplitude measurer 240 to a preselected and desired amplitude. Fly height feedback control 250 generates and couples an appropriate control signal to TFC 260 to control the generation of TFC voltage 261 to achieve or maintain the preselected amplitude. Continual feedback on the measured amplitude and control of the TFC voltage 261 allows for achieving and maintaining the preselected amplitude. As the amplitude is associated with flying height of the slider, this allows control of the flying height of the slider.

At 650 of flow diagram 600, in one embodiment, the method provides the TFC voltage to the slider. In one embodiment, this comprises, TFC 260 generating TFC voltage 261 based upon direction of fly height feedback control 250. TFC 260 then provides the generated TFC voltage 261 to slider body 310 of slider 125 as shown, for example, in FIG. 3. This changes the applied TFC power to the TFC heater coil 315 (FIG. 3).

It is appreciated that system 200 and the method of flow diagram 700 can be implemented for a plurality of sliders and disks in a hard disk drive, such as HDD 100, which includes numerous sliders and numerous disks.

Numerous factors can cause variations in fly height of a slider, even within a single revolution of a disk. Some of these factors include disk microwaviness, lubricant build up on a disk, temperature of operation, altitude, disk radius (e.g., inner diameter, outer diameter, and the like). It is appreciated that the method and system described herein give an accurate measure of fly height which is unaffected by these factors. Thus, the feedback loop described in the method and system herein provide a mechanism for actively controlling fly height of a slider in spite of changing operating conditions. It is appreciated that embodiments can operate swiftly enough to measure and adjust fly height of slider 125 numerous times within a revolution of a disk, thus allowing for conformance with a disk surface within a disk revolution. Additionally, embodiments described herein can be used to measure and control fly height while reading, writing, or idling. Moreover, by selecting to read back modulated RE carrier signal 231 from reader lines 322 or from writer lines 332, fly height of the slider at read head 320, write head 330, or both can be determined and/or controlled.

Example embodiments of the present invention are thus described. Although the embodiments of the present invention have been described in a language specific to structural features and/or methodological acts, it is to be understood that the embodiments of the present invention defined in the appended claims are not necessarily limited to the specific features or acts described above. Rather, the specific features and acts described above are disclosed as example forms of implementing the claims.

What is claimed is:

1. A method of actively controlling slider fly height, said method comprising:

receiving from a slider a modulated radio frequency (RF) carrier signal comprising an amplitude modulated component which is modulated onto said modulated RF carrier signal by vibration of said slider;

measuring an amplitude associated with said amplitude modulated component;

feeding back on said amplitude to control generation of a thermal fly height control (TFC) voltage to apply to said slider such that a selected amplitude of said amplitude modulated component is achieved and maintained, wherein said selected amplitude is associated with a particular preselected fly height of said slider above a surface of a disk; and providing said TFC voltage to said slider.

2. The method as recited in claim 1, further comprising:
injecting an RF carrier signal into said slider to be modulated into said modulated RF carrier signal.

3. The method as recited in claim 2, wherein said injecting an RF carrier signal into said slider to be modulated into said modulated RF carrier signal comprises
injecting an RF carrier signal into said slider, said RF carrier signal being out-of-band above a frequency band of read data and control signals in a hard disk drive in which said slider is operating.

4. The method as recited in claim 2, wherein said injecting an RF carrier signal into said slider comprises:
injecting said RF carrier signal in common mode via signal lines coupled with said slider.

5. The method as recited in claim 2, wherein said injecting an RF carrier signal into said slider comprises:
injecting said RF carrier signal via read lines coupled with a read head of said slider.

6. The method as recited in claim 2, wherein said injecting an RF carrier signal into said slider comprises:
injecting said RF carrier signal via write lines coupled with a write head of said slider.

7. The method as recited in claim 1, further comprising:
injecting an modulating signal into said slider for modulating said RF carrier signal into said modulated RF carrier signal.

8. The method as recited in claim 7 wherein said injecting a modulating signal into said slider comprises:
injecting an out-of-band modulating signal into said slider, said modulating signal being out-of-band below said frequency band of read data and control signals in a hard disk drive in which said slider is operating.

9. The method as recited in claim 7, wherein said injecting a modulating signal into said slider for modulating said RF carrier signal in to said modulated RF carrier signal comprises:
injecting said modulating signal at a frequency of approximately one half a pitch two mode frequency of vibration of said slider.

10. The method as recited in claim 7, wherein said injecting a modulating signal into said slider for modulating said RF carrier signal in to said modulated RF carrier signal comprises:
injecting a plurality of modulating signals at a plurality of different frequencies.

11. The method as recited in claim 7, wherein said injecting a modulating signal into said slider for modulating said RF carrier signal in to said modulated RF carrier signal comprises:
injecting said modulating signal at a frequency of approximately a pitch two mode of vibration of said slider; and injecting a linearizing direct current (DC) bias voltage into said slider to facilitate vibration of said slider at a first harmonic of said modulating signal.

12. The method as recited in claim 1, wherein said receiving from a slider a modulated RF carrier signal comprising an amplitude modulated component comprises:
receiving said modulated RF carrier as a reflected signal via a signal line utilized to inject an unmodulated version of said RF carrier signal.

13. The method as recited in claim 1, wherein said measuring an amplitude associated with said amplitude modulated component comprises:
utilizing a bandpass filter to capture a frequency range associated with a portion of said amplitude modulated component.

14. The method as recited in claim 1, wherein said measuring an amplitude associated with said amplitude modulated component comprises:
utilizing a fast Fourier transform to determine a power spectrum associated with said amplitude modulated component.

15. An active slider fly height controller, said controller comprising:
a modulated carrier receiver configured for receiving from a slider a modulated radio frequency (RF) carrier signal comprising an amplitude modulated component which is modulated onto said modulated RF carrier signal by vibration of said slider;

an amplitude measurer coupled with said modulated carrier receiver and configured for measuring an amplitude associated with said amplitude modulated component;

fly height feedback control coupled with said amplitude measurer and configured for feeding back on said amplitude to control generation of a thermal fly height control (TFC) voltage to apply to said slider such that a selected amplitude of said amplitude modulated component is achieved and maintained, wherein said selected amplitude is associated with a particular preselected fly height of said slider above a surface of a disk; and a thermal fly height control coupled with said fly height feedback control and configured for generating and providing said TFC voltage to said slider.

16. The active slider fly height controller of claim 15, wherein said modulated carrier receiver further comprises:
a demodulator for demodulating said amplitude modulated component to achieve a demodulated amplitude component for coupling to said amplitude measurer.

17. The active slider fly height controller of claim 15, further comprising
a carrier signal generator configured for generating an RF carrier signal and injecting said RF carrier signal into said slider to be modulated into said modulated RF carrier signal.

18. The active slider fly height controller of claim 15, further comprising:
a modulation signal generator configured for generating and injecting a modulating signal into said slider for modulating said RF carrier signal into said modulated RF carrier signal.

19. The active slider fly height controller of claim 18, further comprising:
a linearization biaser coupled with a body of said slider and configured for generating a direct current (DC) linearization bias voltage and coupling said linearization bias voltage to said slider body.

20. A hard disk drive comprising:
a disk comprising a surface for magnetic storage of data;

a slider configured for moving across said surface for writing and reading of said data; and an active fly height controller for actively controlling a fly height of said slider above said disk during operation of said disk drive, said active fly height controller comprising:

a modulated carrier receiver configured for receiving from a slider a modulated radio frequency (RF) carrier signal comprising an amplitude modulated component which is modulated onto said modulated RF carrier signal by vibration of said slider;

an amplitude measurer coupled with said modulated carrier receiver and configured for measuring an amplitude associated with said amplitude modulated component;

fly height feedback control coupled with said amplitude measurer and configured for feeding back on said amplitude to control generation of a thermal fly height control (TFC) voltage to apply to said slider such that a selected amplitude of said amplitude modulated component is achieved and maintained, wherein said selected amplitude is associated with a particular preselected fly height of said slider above a surface of a disk; and a thermal fly height control coupled with said fly height feedback control and configured for generating and providing said TFC voltage to said slider.

21. The hard disk drive of claim 20, wherein said active slider fly height controller further comprises:

a carrier signal generator configured for generating an RF carrier signal and injecting said RF carrier signal into said slider to be modulated into said modulated RF carrier signal.

22. The hard disk drive of claim 20, wherein said active slider fly height controller further comprises:

a modulation signal generator configured for generating and injecting a modulating signal into said slider for modulating said RF carrier signal into said modulated RF carrier signal.

23. The hard disk drive of claim 22, wherein said active slider fly height controller further comprises:

a linearization biaser coupled with a body of said slider and configured for generating a direct current (DC) linearization bias voltage and coupling said linearization bias voltage to said slider body.

* * * * *